Feb. 16, 1965 B. F. RANDRUP 3,169,629
SPOTTING CONVEYOR FOR BOTTLES AND THE
LIKE AND ARTICLE FOR USE THEREWITH
Filed Nov. 13, 1962 2 Sheets-Sheet 1
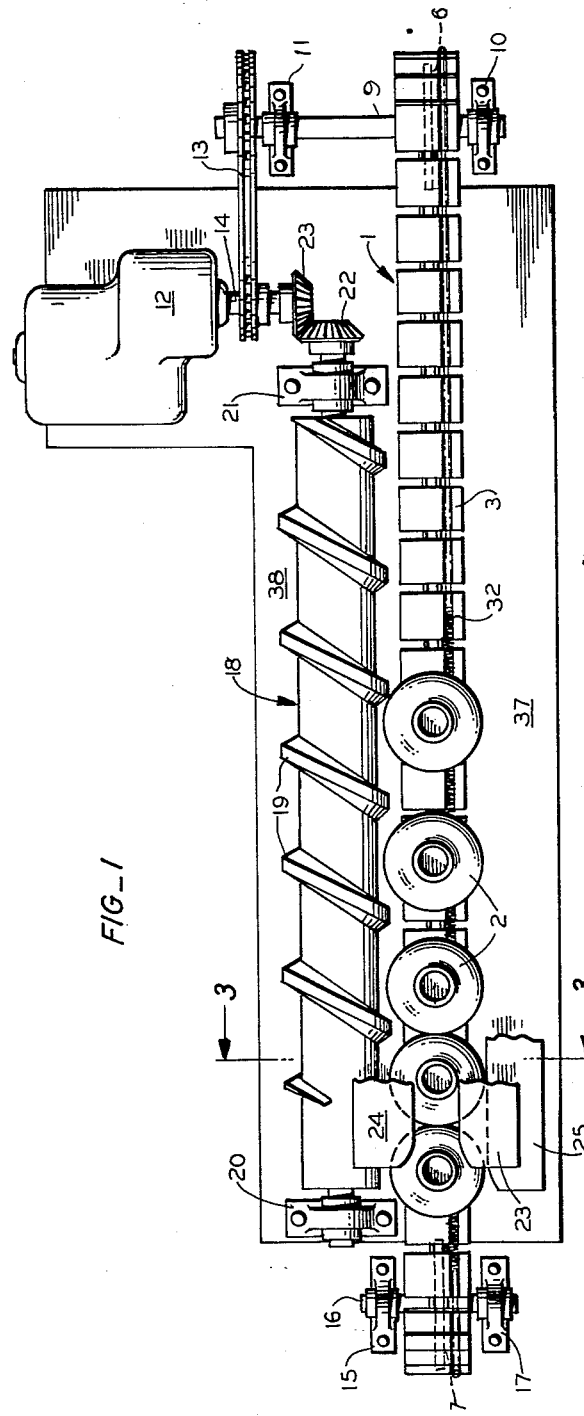
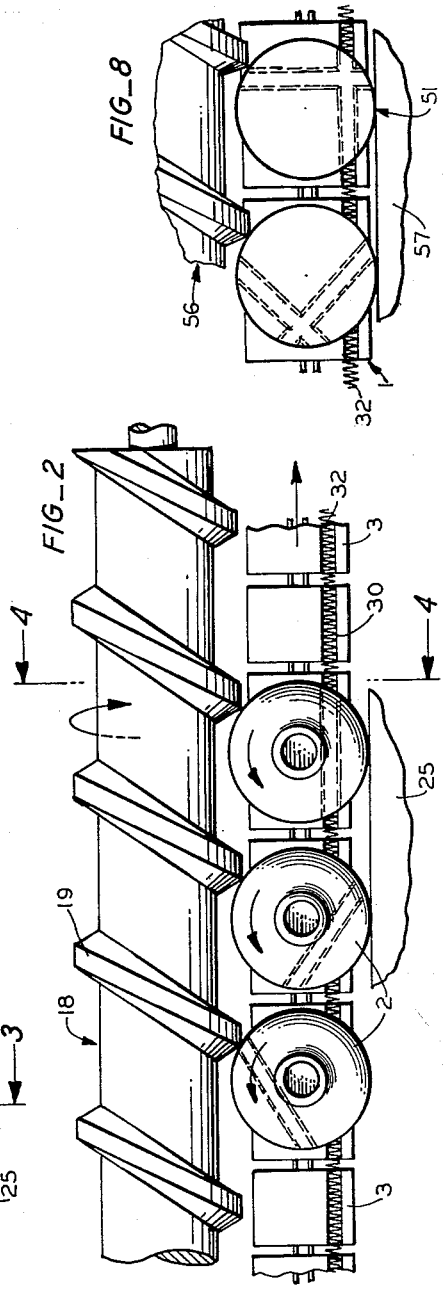
INVENTOR.
BENJAMIN F. RANDRUP
BY
Gordon Wood
ATTORNEY

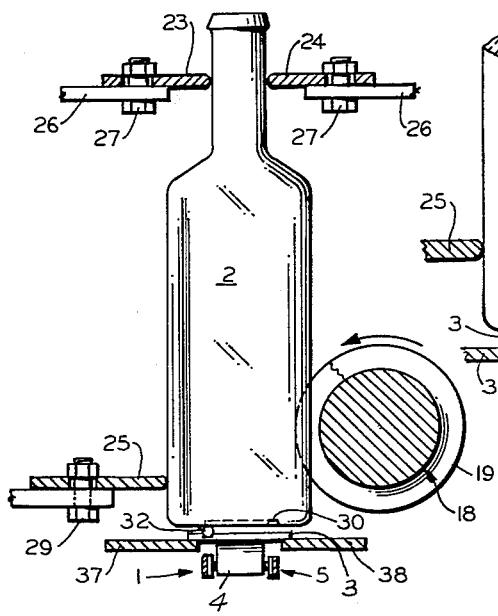
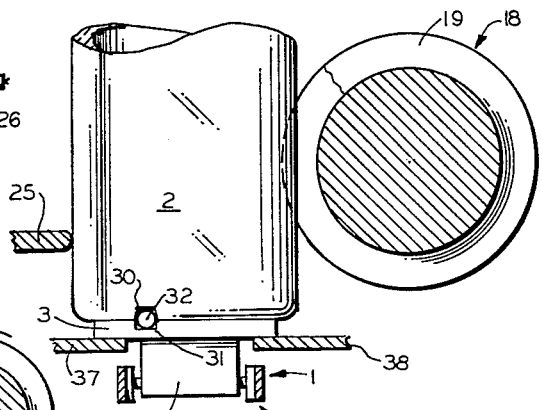
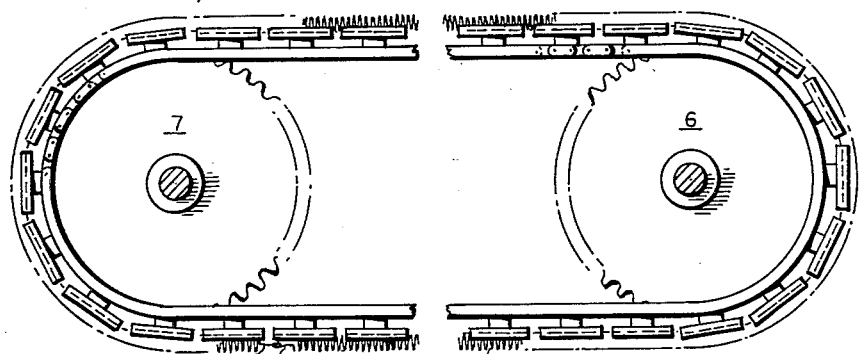
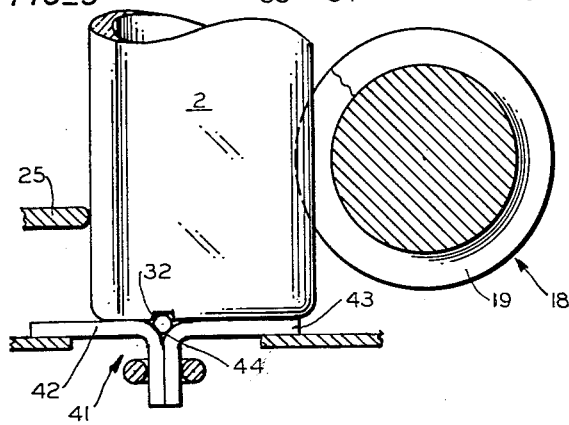
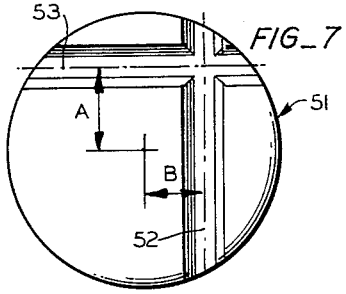
INVENTOR
BENJAMIN F. RANDRUP
BY Gordon Wood.
ATTORNEY

United States Patent Office 3,169,629
Patented Feb. 16, 1965

3,169,629
SPOTTING CONVEYOR FOR BOTTLES AND THE LIKE AND ARTICLE FOR USE THEREWITH
Benjamin F. Randrup, Pleasant Hill, Calif., assignor to John Burton Machine Corporation, Concord, Calif.
Filed Nov. 13, 1962, Ser. No. 236,961
7 Claims. (Cl. 198—33)

This invention relates to spotting devices for arranging cylindrical articles such as bottles in a predetermined angular relationship. The invention is, in some respects, an improvement over copending application Serial No. 9,734 filed February 19, 1960, and United States Patent Nos. 2,159,318 and 2,308,154, both in the name of Carter.

The present invention is particularly directed to the spotting of articles such as bottles that are provided with spotting grooves on their bottom walls such as are shown in the above noted Carter patents.

The main object of the invention is the provision of an effective but simple spotting conveyor for arranging bottles and the like in a predetermined angular relationship.

Another object of the invention is the provision of a spotting conveyor which may be quickly converted from a spotting conveyor to a conventional conveyor, and vice versa, in a minimum of time.

Still another object of the invention is the provision of a spotting conveyor in which the article is held more effectively in the spotted position.

Yet another object of the invention is the provision of a novel container structure that permits successive spotting operations to be performed thereon.

Other objects and advantages will be apparent from the following specification and drawings.

FIG. 1 is a top plan view of the spotting conveyor and an associated feed screw.

FIG. 2 is an enlarged fragmentary plan view of the feed screw and conveyor of FIG. 1 showing the manner in which the feed screw rotates the bottles about their vertical axes.

FIG. 3 is a typical section through the conveyor and screw as taken in a plane indicated by lines 3—3 of FIG. 1.

FIG. 4 is a view similar to FIG. 3 as taken in the plane indicated by lines 4—4 of FIG. 2 showing a bottle in spotted position.

FIG. 5 is a section similar to FIG. 4 showing a different type of conveyor.

FIG. 6 is a schematic side elevation of the conveyor with a spotting element applied thereto.

FIG. 7 is a bottom plan view of a bottle showing the manner in which the same is formed with a plurality of spotting grooves.

FIG. 8 is a fragmentary plan view of a conveyor and its associated feed screw showing the spotting of a bottle in a position at right angles to the position of FIG. 2.

In detail, the apparatus of the present invention is adapted to be employed with a bottle conveyor which carries the bottles to the labeling machine (not shown) for example. It will be understood that the invention lends itself to use for various purposes and with other conventional cylindrical articles, for example, cans; but it will be described in detail with reference to bottles.

A horizontally extending conveyor generally designated 1 is employed for carrying bottles 2 along a predetermined path of travel in one direction. The type of conveyor shown in the drawings at FIGS. 1 and 2 is one that includes a plurality of rectangular support plates 3, each of which is pivotally secured by a support 4 (FIG. 3) to a link joint of a chain generally designated 5. At one end of the conveyor 1 the chain 5 passes around the driven sprocket wheel 6 (FIG. 1) and at the opposite end it passes around an idler sprocket 7. Intermediate its opposite ends, the upper run of the conveyor 1 is supported on longitudinally extending base plates 37, 38 which are spaced apart transversely of conveyor 1 and slidably engage the undersides of conveyor support plates 3 adjacent the opposite ends of the latter. Driven sprocket 6 is supported on a shaft 9 which in turn is rotatable in bearings 10, 11. Shaft 9 may be driven through a sprocket chain 13 from the output shaft 14 of a motor reducer such as indicated at 12 (FIG. 1). Idler sprocket 7 may be supported on a suitable shaft 16 rotatable in bearings 15, 17 (FIG. 1).

Alongside and above conveyor 1 is a feed screw generally designated 18 provided with helix 19 which is sufficiently large to accommodate an article within each flight thereof (FIG. 2). As best seen in FIG. 1, the screw 18 is rotatably supported at its opposite ends in bearings 20 and 21 and may be driven through bevel gears 22, 23 from the shaft 14 of motor reducer 12.

It will be understood that the speed of rotation of shaft 14, the size of gears 22, 23 and the sprockets of sprocket chain 13 may be proportioned so that the forward speed of conveyor 1 may be made slightly greater than the advancing speed of helix 19. As best seen in FIGS. 1, 2 the conveyor 1 attempts to move the bottles 2 along at a linear speed greater than that permitted by the helix 19 so that the trailing edge of each helix engages a bottle as best seen in FIG. 2.

The type of bottle employed with the instant invention is one formed with a groove 30 along its bottom wall. (See Carter Patent Nos. 2,159,318 and 2,308,154.) As best seen in FIG. 3 the bottles 2 are held in a predetermined path of travel parallel to conveyor 1 by a means of a pair of flat bars 23, 24 positioned on opposite sides of the necks of the bottles and a third flat bar 25 positioned to engage the side of each bottle opposite the feed screw 18. Said flat bar guides 23, 24 may be adjustably secured to suitable frame members 26 by means of bolts 27 in the desired position relative to feed screw 18. Similarly, flat bar 25 may be adjustably secured by bolts 29 to the adjacent structure.

Each of the support plates 3 which combine to form the conveyor 1 is provided with a longitudinally extending groove 31 (FIG. 4) with the grooves of all supports being in alignment to permit an elongated spotting element 32 to be received therein. As best seen in FIG. 6 the elongated element 32 preferably comprises a closely coiled helically wound spring, the wire of which is formed with hooks 33, 34 at the ends of the spring so as to provide a means for securing said ends together. The loop thus formed by element 32 is snugly received within the groove 31 formed on the support plates 3 so that the element 32 becomes, in effect, a part of the conveyor 1. The outside diameter of the coil formed by the wire of element 32 is such that the coil is partially received within the groove 31 with a portion of the same projecting upwardly into engagement with the bottles 2 on conveyor 1. Referring to FIGS. 3, 4 it will be noted that each bottle is held upwardly from the upper surface of plates 3 of conveyor 1 by the element 32 in all positions of the bottles except when the groove 30 in the bottom wall of the bottle registers with the longitudinally extending element 32 carried by conveyor 1. In this latter case as best seen in FIG. 4 the upper portion of the element 32 is received in groove 30 of the bottles so that the latter may drop downwardly onto the upwardly directed faces of plates 3 of conveyor 1. Considering FIGS. 2, 3 and 4 it will be seen that the groove 31 of the conveyor 1 is positioned on the opposite side of the center of the bottle from the screw 18 so that the element 32 urges the bottles in a counterclockwise direction until the grooves 30 on the bottom walls register with the element 32. This effect follows from the fact that the conveyor 1 is moving at a greater linear speed than the helix on screw 18.

It will be seen that the above described structure provides an extremely simple and effective method of rotating the bottles automatically until they are all oriented in the same manner relative to the grooves 30. It will also be apparent that the element 32 may readily be removed from the conveyor 1 so that the latter may be operated as any conventional conveyor. Such removal of the element 32 may be effected simply by expanding the same against its own resiliency and urging it off conveyor 1. The installation of the spotting element is correspondingly simple.

Although it would appear that element 32 travels at the same speed as conveyor 1 this does not actually happen in practice. Surprisingly enough, the upper run of element 32 travels faster than the conveyor so that there is some relative movement between said element 32 and the conveyor. The action of conveyor 1 as the support plates 3 move around the forward driving sprocket 6 is apparently such that tension is applied to the upper run of the element 32 causing it to move forwardly faster than the conveyor. This results in a slight but noticeable forward movement of the element 32 relative to the conveyor and speeds up the spotting operation. Such speedup follows from the fact that the speed of rotation of the bottles is directly proportional to the difference in linear speed between the speed of the screw 18 and the conveyor 1, or, more exactly, the difference between the speed of screw 18 and the element 32. Since the element 32 is traveling at a greater speed than the conveyor 3 the spotting operation is carried out that much faster. Furthermore, once the bottle is supported on the support plates 3 of conveyor 1 with the element 32 being received in the groove 30 the movement of element 32 relative to the bottle 2 tends to keep the bottle in its spotted position against any tendency for it to move out. Since such movement out of spotted position would require the bottle to be raised upwardly from the upper surface of plates 3 of conveyor 1, there is very little likelihood of this happening.

An alternative form of conveyor is shown in FIG. 5 wherein the conveyor 41 is formed of pairs of plates 42, 43 and of the type shown in application Serial No. 158,766 in the name of Harold B. Rice. In this case the juncture between the two plates 42, 43 is such that an upwardly opening groove 44 is formed to receive the element 32. In such a case it is a simple matter to install and remove the element 32 as desired.

It will be understood that the present invention could be employed by making the speeds of screw 18 and conveyor 1 such that the screw urges the bottles 2 forwardly at a speed greater than the speed at which conveyor 1 is moving. In such a case the conveyor groove 31 that receives the element 32 would be provided on the opposite side of the center line of the bottle from the screw 18 as in the preferred embodiment shown so that the element 32 would tend to retard the movement of the bottles and the helix 19 would tend to advance said bottles. Such coaction between the element 32 and the screw 18 would cause the bottles to rotate in a clockwise direction or opposite to that shown in FIG. 2. However, it is preferable to permit the element 32 and conveyor 1 to move at a faster speed than the screw 18 for most installations.

It will be understood that the element 32 may be formed of a material other than coil spring wire. For example, the same may be formed from a closed loop of rubber or the like or any other material having sufficient resiliency. A coiled wire is preferable, however, since it will resist abrasion and will not readily wear out.

For some labelling operations it is desirable to be able to spot the bottles in each of two different predetermined positions. For example, when it is desired to place two tax stamps on a bottle neck in positions so that they both can readily be seen they are best placed in positions 90° offset from each other. In such a case it is desirable to spot each bottle in a predetermined first position relative to a portion of the bottle structure (such as a groove in the bottom) and to then spot the bottle in a second predetermined position at right angles to the first position.

Such dual spotting may be accomplished by providing the bottle, such as shown at 51 in FIG. 7, with grooves 52, 53 at right angles to each other. Groove 52 may be placed, for example, in the same position as groove 30 in bottle 2 at a distance B from the center of the bottle. Groove 53 may be formed at right angles to groove 52 and at a distance A (greater than B) from the center of the bottle.

A bottle formed with two grooves as above described can be employed in the apparatus described in FIGS. 1-6 without any effect on its operation because of the presence of groove 53. This follows from the fact that the locus of the centers of the bottles is fixed, as is the distance of the element 32 therefrom, so that groove 53 could never attain a position in registration with the element 32.

However, a second distinct spotting operation may be carried out as shown in FIG. 8 in order to spot the bottles in a position at right angles to the spotted position in FIG. 2. In FIG. 8 the conveyor 1 is shown cooperating with a feed screw 56 and lower guide bar 57 with the screw and bar positioned so that the locus of the bottle centers is offset from the spotting element 32 a distance equal to the distance A in FIG. 7. In this manner the bottles 51 are spotted in positions at right angles to the positions in which they are spotted by the structure of FIG. 2.

A further modification contemplated by the present invention is the provision of a bottle with a pair of slots formed in its bottom and arranged in parallel relation. Again, said slots are spaced different distances from the center so that only one slot cooperates with the spotting element on the conveyor for one particular spotting set up.

When the slots are parallel the bottles may be spotted in two different predetermined relationships 180° offset from each other. Such a dual spotting arrangement is of value, for example, when it is desired, as a subsequent operation, to apply labels to opposite sides of the bottle in successive steps.

In some instances it may only be necessary to orient the bottles in one of two positions 180° apart. In such a case identical grooves spaced equal distances from the center of the bottle may be employed so that the spotting operation is performed in half the time.

Another modification contemplated by the invention is the provision of two or more grooves on the conveyor so that one or the other may receive the spotting element. An example of the use of such modification would be the conversion of the apparatus from one bottle size to another in which case it would merely be necessary to move the spotting element from one groove to another rather than shifting the feed screw.

The upper neck bar 24 that is on the same side of the bottle as the feed screw may be omitted or spaced slightly from the bottle neck so as to be normally inoperative. This is because it is desirable to have the bottle lean toward the screw at its upper end to insure positive coaction with the screw.

The above very specific description of the preferred forms of the invention are not to be taken as restrictive of the invention since minor variations in design will occur to those skilled in the art without departing from the invention as defined in the following claims.

I claim:

1. In a spotting device that includes article rotating means for use with an article having a bottom wall provided with a downwardly opening groove therein comprising:

an elongated conveyor having an article supporting surface, an independent spotting element carried by said surface and extending a substantial distance along the active conveyor run and adapted to be received in said groove when said article is in a predetermined angular position relative to said conveyor, and means for removably securing said element to said conveyor to permit removal therefrom when desired.

2. A device according to claim 1 wheren said conveyor is in the form of an endless loop and said spotting element comprises an endless loop encircling said conveyor.

3. In a spotting device that includes article rotating means and a conveyor for supporting articles thereon, an article supporting member in said conveyor having an upwardly directed article engaging face adapted to engage the bottom walls of such articles, said face being formed with a groove extending longitudinally of said conveyor, and an elongated independent spotting element removably received in said groove and extending a substantial distance along the active conveyor run.

4. A device according to claim 3 wherein said element is an elongated closely coiled spring.

5. In a conveyor structure for use in conveying articles provided with spotting grooves in their bottom walls and which structure includes rotating means for rotating such articles about their vertical axes, an article support on said conveyor having an upper surface adapted to engage said bottom walls and adapted to be moved along a path of travel for so conveying said articles, said surface being provided with a groove extending longitudinally of said path, an elongated element received in said groove and extending a substantial distance along the active conveyor run, said element adapted to engage the bottom walls of said articles for urging said articles along said path, said rotating means including said element and retarding means in engagement with the sidewalls of said articles for retarding movement of said articles along said path, said element being adapted to be received in the spotting grooves of said articles when the latter are rotated into registration with said element, whereby said bottom walls of said article drop onto said surface for movement therewith along said path.

6. A device according to claim 5 wherein said retarding means comprises a feed screw wherein the forward speed of the helix is less than the forward speed of the element carried by said conveyor.

7. In a conveyor formed with rotating means and a plurality of article supporting platforms provided with horizontal and vertical flanges with the vertical flanges of said sections removably secured together and with the junctures of the flanges of said sections coacting to provide an upwardly opening groove, a unitary elongated element extending a substantial distance along the active conveyor run and received in the grooves formed at said junctures.

References Cited in the file of this patent

UNITED STATES PATENTS

| | | |
|---|---|---|
| 2,159,318 | Carter | May 23, 1939 |
| 2,707,547 | Gewecke | May 3, 1955 |
| 2,911,089 | Carter | Nov. 3, 1959 |
| 2,936,920 | Wallace | May 17, 1960 |
| 3,069,039 | Stickney | Dec. 18, 1962 |